Figure 1:
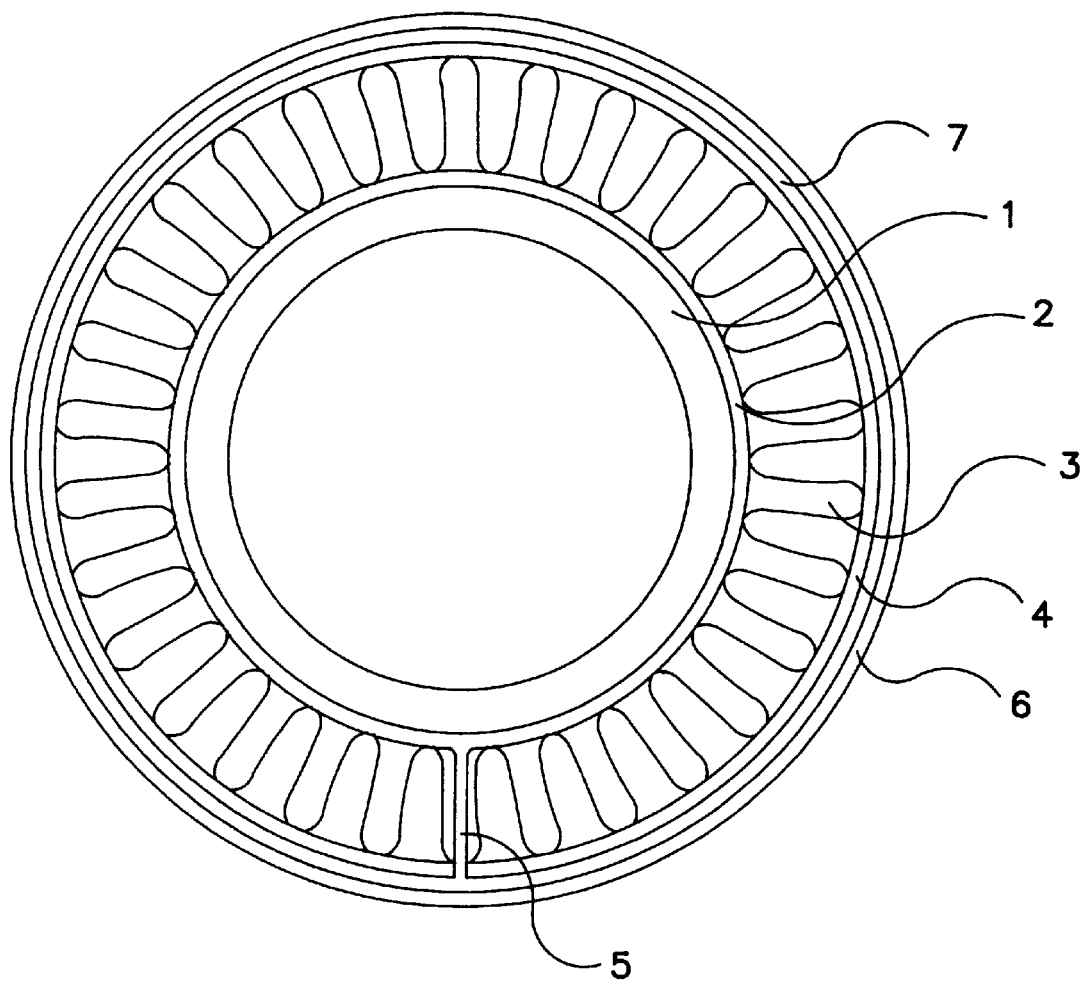

United States Patent [19]

Korsgaard

[11] Patent Number: 6,026,863

[45] Date of Patent: Feb. 22, 2000

[54] INSULATION SYSTEM AND A METHOD OF PROVIDING AN INSULATION SYSTEM ON A PIPE OR A CONTAINER ("INSULATION SYSTEM")

[75] Inventor: Vagn Korsgaard, Hørsholm, Denmark

[73] Assignee: Hygrowick-International APS, Horsholm, Denmark

[21] Appl. No.: 09/066,440

[22] PCT Filed: Oct. 28, 1996

[86] PCT No.: PCT/DK96/00448

§ 371 Date: Jun. 1, 1998

§ 102(e) Date: Jun. 1, 1998

[87] PCT Pub. No.: WO97/16676

PCT Pub. Date: May 9, 1997

[30] Foreign Application Priority Data

Oct. 30, 1995 [DK] Denmark .................................. 1217/95

[51] Int. Cl.[7] ...................................................... F16L 9/14
[52] U.S. Cl. .............................................................. 138/149
[58] Field of Search ........................ 62/272, 55; 428/251; 138/149

[56] References Cited

U.S. PATENT DOCUMENTS

| | | | |
|---|---|---|---|
| 4,745,760 | 5/1988 | Porter | 62/55 |
| 5,296,287 | 3/1994 | Ribbans | 428/251 |
| 5,520,009 | 5/1996 | Jepsen et al. | 62/272 |
| 5,690,147 | 11/1997 | Cridland et al. | 138/149 |

*Primary Examiner*—Andres Kashnikow
*Assistant Examiner*—Davis Hwu
*Attorney, Agent, or Firm*—Watson Cole Grindle Watson, P.L.L.C.

[57] ABSTRACT

A self-drying insulation system for a pipe or a container (1) which has a temperature that is periodically lower than the dew point temperature of the ambient air includes an inner capillary-active slot between the surface of the pipe or container (1) and a surrounding heat insulating layer (3) in which one or more capillary-active openings (5) are provided, these openings connecting the inner side of the insulating layer (3) with its outer side, and a water-repellent membrane (6) surrounding the outer side of the insulating layer so as to form an outer slot (7) between the outer side of the insulating layer (3) and the membrane (6).

12 Claims, 1 Drawing Sheet

INSULATION SYSTEM AND A METHOD OF PROVIDING AN INSULATION SYSTEM ON A PIPE OR A CONTAINER ("INSULATION SYSTEM")

The present invention relates to an insulation system for a pipe or a container having a surface temperature which for shorter or longer periods is lower than the dew point temperature of the ambient air, and comprising an inner capillary-active slot between the surface of the pipe or the container and a surrounding heat insulating layer in which one or more capillary-active openings are provided which connect the inner side of the insulating layer with its outer side, so that condensed water can be transported by capillary action from the surface of the pipe or the container to the outer side of the insulating layer, from where it can evaporate into the ambient air.

EP patent No. 0 528 936 discloses an insulation system of the above kind, in which a water absorbing material is disposed within the inner capillary-active slot, which material extends out through a slot-shaped opening in the heat insulating layer onto the outer side of the insulating layer, and wholly or partly around it. The known insulation system is especially suited for insulating pipes for transport of cold media, such as cooling liquid. When condensation of water vapour takes place on the surface of such pipes, the condensed water will be absorbed in the inner water absorbing layer, and from there it will move out by capillary action into the outer water absorbing layer, from which it evaporates into the ambient air, the insulation system hereby becoming self-drying.

It has hitherto been presumed that the prerequisite of the known insulation system being capable of functioning is that at least a portion of the outer side of the outer water absorbing layer is in direct contact with the ambient air, so that free evaporation of condensed water can take place from this portion.

In cases in which it has been desired to cover the outer water absorbing layer with a protective layer, e.g. a plastic or metal sheath, the sheath material has consequently been provided with holes or slits.

For cooling installations e.g. for use in the food industry, it is required that the installations and associated cooling tubes and containers can be cleaned effectively, i.a. by pressure flushing. As a result, e.g. the food industry has been reluctant to use insulation systems of the above kind which are provided with an outer protective sheath with holes or slits.

According to the present invention an insulation system of the kind stated in the preamble is provided, which is characterized in that the outer side of the insulating layer is surrounded by a water-repellent membrane so as to form an outer slot between the outer side of the insulating layer and the membrane.

Provided that the water-repellent membrane is also completely water-proof and diffusion-proof, the present insulation system will theoretically be unnecessary. In practice it has, however, been found that it is impossible to provide a completely water-proof and diffusion-proof membrane even by use of a metal sheath, since it is impossible to make joints so as to be permanently tight.

The insulation system according to the invention allows water penetrating through leaks to diffuse out again, either through the leaks or through the water-repellent membrane, which in that case must be made of a material which is more or less diffusion-open. In case of pipes which are not exposed to the influence of water, the water-repellent membrane can be made of metal sheets, the system, as will appear from the following description, being "self-sealing" as regards minor leaks in joints. In case of pipes which are flushed, or in some other way are exposed to direct influence of water, the water-repellent membrane should be made of a diffusion-open material, since not inconsiderable amounts of water can penetrate through even small leaks in joints, whereas drying-out by diffusion through small holes proceeds much more slowly.

The invention is based on a novel physical (hygrothermic) discovery to the effect that by means of the capillary sucking property of a wick substance it is possible to build up a water vapour partial pressure within a cavity, which is higher than the partial pressure within a second cavity having a temperature which is lower than the dew point temperature of the air in the first, warmer cavity which communicates with the first cavity via a capillary-active duct or slot in which a wick substance may be disposed.

Examples of suitable membrane materials include waterproof and diffusion-open textile materials, such as those which are sold under the registered trade marks Trevira® and GORE-TEX®, and which i.a. are used for manufacturing leisure clothes. Alternatively, use may be made of a linen fabric coated with a water-repellent paint.

According to a preferred embodiment of the insulation system according to the invention, the surrounding membrane is both water-proof and diffusion-open. The waterproof membrane may expediently also consist of a plastic sheath, such as a plastic foil sold under the trade mark Isogenopak®, which is fairly diffusion-open, or a metal sheath, in cases where a diffusion-open membrane is not required because the pipe is not exposed to direct influence of water, but where a strong protection against mechanical impacts is desired.

According to a preferred embodiment of the insulation system according to the invention, a layer of a water absorbing material is disposed within both the inner and the outer slot.

When the opening in the heat insulating layer is an axially extending slot, the two layers of water absorbing material preferably merge, and the outer layer preferably consists of two parts extending in opposite directions from the slot. Such an insulation is particularly easy to provide on e.g. rectilinear cold pipes, since it suffices merely to position the absorbing layer, e.g. in the form of a piece of felt, on the pipes and with outwardly projecting ends, and to mount tubular sheathing insulating elements, with a diffusion-proof surface layer, around the pipe, and subsequently to unfold the two free ends of the water absorbing layer from the slot, and optionally attach these ends to the outer side of the heat insulating layer and the diffusion-proof layer. Om top of the water-repellent and optionally diffusion-open membrane is mounted.

The layers of water absorbing material are preferably fibre layers consisting of glass fibres, organic, synthetic or natural fibres. An example of a well-suited fibre material is a non-woven fabric material of hydrophilic, synthetic fibres, such as nylon or polypropylene felt, having a weight of 20–150 g/m$^2$. When there are special requirements as to fire safety, glass tissue will be well-suited.

The inner water absorbing layer is, as mentioned, in contact with the outer side of the insulated pipe or container, but is not necessarily in contact with all portions of the outer side of the pipe or the container. For example, the inner water absorbing layer does not necessarily extend all the way around the pipe, and nor is it necessary for it to be in contact with the pipe over the entire length of the pipe. Thus, the inner and the outer water absorbing layer may consist of strips, which at intervals are in contact with the pipe.

By using closed-cell insulating materials, such as foamed rubber of foamed plastic, the need for using an inner water absorbing layer is reduced to a minimum, and it may optionally be left out completely and replaced by a surface treatment of the pipe and the inner side of the insulation with a surfactant, since the capillary forces in the cavity between the outer side of the pipe or the container and the insulating layer will transport condensed moisture onto the water absorbing layer in the opening in the insulating material. Similarly, use of an outer water absorbing layer can be reduced to a minimum.

The heat insulating material may consist of known insulating materials, and it is preferred to use mineral wool or foamed open-cell plastic, and in particular insulating materials having a diffusion-proof surface, but also closed-cell insulating materials, such as foamed rubber or foamed plastic, are suitable.

When insulating pipes, use may be made of a special tubular mineral wool product as combined water absorbing layer and heat insulating layer, which product has a thin, integrated inner layer of mineral wool, which has been made water absorbing. This inner layer, which e.g. has a thickness of 1–3 mm, can be made water absorbing during the production process by increasing the temperature in the inner layer to a point above the temperature at which the water-repellent impregnating agent, which such mineral wool products usually contain, decomposes.

The diffusion-proof layer on the outer side of the heat insulating layer may expediently consist of a plastic or metal foil, e.g. an aluminium foil.

The insulation system described above is not only suitable for insulating the actual pipe, but also for mounting on valves, flanges, fittings and the like, which are built into or attached to the pipe.

The invention also relates to a method of providing an insulation system on a pipe or a container of the above kind. The method according to the invention is of the kind, wherein an insulation system is provided on a pipe or a container having a surface temperature which for shorter or longer periods is lower than the dew point temperature of the ambient air, wherein a heat insulating layer is provided around the pipe or the container so as to form an inner capillary-active slot between the surface of the pipe or the container and the heat insulating layer, that one or more capillary-active openings are provided in the heat insulating layer, which openings connect the inner side of the insulating layer with its outer side, so that condensed water can be transported by capillary action from the surface of the pipe or the container to the outer side of the insulating layer, or to the outer side of the diffusion-proof layer disposed on the insulating layer, from where it can evaporate into the ambient air, and which is characterized in that a water-repellent membrane is positioned around the insulating layer so as to form an outer slot between the outer side of the insulating layer and the membrane.

In the following the invention is described in more detail, reference being made to the drawing which shows a cross-section through a cold-water pipe surrounded by a preferred embodiment of an insulation system according to the invention.

In the drawing, 1 is a cold-water pipe, the outer side of which is covered by a water absorbing layer 2, such as a felt layer, which fills out an inner slot. The water absorbing layer 2 is surrounded by a heat insulating layer 3, such as a layer of mineral fibres. The heat insulating layer 3 is, in the embodiment shown, surrounded by a diffusion-proof layer 4, but by use of a diffusion-proof heat insulating layer, such as a cellular plastics layer or cellular rubber layer, the diffusionproof layer 4 may be left out. An axially extending slot 5 is provided in the heat insulating layer 3 and in the surrounding diffusion-proof layer 4, and portions of the water absorbing layer 2, which acts as a capillary sucking wick substance, are passed out through the slot 5 and disposed so as to cover the outer side of the diffusion-proof layer 4. The water absorbing layer 2 on the outer side of the diffusion-proof layer 4 is surrounded by a water-proof membrane 6.

The annular cavity between the diffusion-proof layer 4 and the water-proof membrane 6 forms an outer, warm slot 7.

EXAMPLE

For the purpose of clarifying the mode of action of the insulation system shown in the drawing, it is assumed that the surface temperature of the cold-water pipe is 5° C. This temperature corresponds to a saturation pressure of 875 Pa. If the ambient air has a temperature of 20° C. and a relative air humidity of 65%, this corresponds to a partial pressure of 1545 Pa. For as long as the insulation system is dry, moisture transport will take place by diffusion from the ambient air having the higher partial pressure of 1545 Pa to the pipe surface having the lower partial pressure of 875 Pa.

This will result in formation of condensed water on the pipe surface. The condensed water will, as it is formed, be absorbed by the water absorbing layer 2, and will be sucked out through the slot 5 by capillary action simultaneously with its temperature, and consequently the partial pressure, increasing. The wetting of the water absorbing layer 2 means that the partial pressure will equal the saturation pressure at the temperature which the water absorbing layer has at the particular site. Dependent on the heat insulating capacity of the insulating layer 3, the temperature of the diffusion-proof layer 4 and the temperature of the membrane 6 will be almost equal, and only 1–2° C. lower than the temperature of the ambient air. The partial pressure in the slot 7 between the diffusion-proof layer 4 and the membrane 6 will consequently equal the saturation pressure at 18–19° C., i.e. about 2 100 Pa. Since this partial pressure is about 550 Pa higher than the partial pressure of the ambient air, the diffusion, which was inwardly directed at the start of the wetting, will gradually be replaced by an outwardly directed diffusion, which will result in a drying-out of the insulation system. The drying-out will proceed for as long as there is excess moisture in the system, in particular on the pipe surface. Consequently, an equilibrium is created at a low moisture content, where the partial pressure within the cavity between the diffusion-proof layer 4 and the membrane 6 will equal the partial pressure of the ambient air, and consequently diffusion of moisture will occur neither into nor out of the system, which thus remains dry, and the actual insulating material will thus retain its original heat insulating capacity.

If the membrane 6 is completely diffusion-proof, no inwardly directed diffusion (wetting) or no outwardly directed diffusion (drying-out) will be able to occur, but, as it is, this is not required unless the insulating material was applied in moist state. As stated in the preamble, it will in practice be virtually impossible to make the membrane 6 completely and permanently diffusion-proof, even by using a metal sheath, because of joints in the sheath.

Any unintentional leaks in the membrane 6, brought about e.g. by damage or insufficient sealings of joints, will cause no wetting of the insulation system, since they will merely result in improved possibilities of diffusion of moisture out through the leaks in the membrane 6.

Irrespective of the membrane 6 being made of a completely water-proof and diffusion-proof material, such as a metal sheath, leaks will occur, e.g. in the form of insufficiently sealed joints. These leaks may give rise to penetration of water from cleaning or, in case of outdoor installations, from rain. When using the insulation system according to the invention, penetrating moisture will diffuse out through the leaks, causing drying-out of the insulation system.

However, as stated above, it may be expedient, where the pipe is exposed to direct influence of water, not to make the sheath of metal, but of a comparatively diffusion-open material, such as e.g. PVC-foil, since quite substantial amounts of water can enter through even small leaks in sheath joints, which water it will be hard to dry out again by diffusion through the same leaks.

I claim:

1. An insulation system for a pipe or a container having a surface temperature which for shorter or longer periods is lower than the dew point temperature of ambient air, and comprising an inner capillary-active slot between a surface of the pipe or the container and a surrounding heat insulation layer in which one or more capillary-active openings are provided which connect an inner side of the insulating layer with an outer side thereof, so that condensed water can be transported by capillary action from the surface of the pipe or the container to the outer side of the insulating layer, from where it can evaporate, said heat insulating layer having a diffusion proof outer side and being surrounded by a water-repellant membrane, so as to form an outer slot between the outer side of the insulating layer and the membrane.

2. An insulation system according to claim 1, wherein the membrane is a diffusion-open.

3. An insulation system according to claim 2, wherein that the membrane is a plastic or metal sheath.

4. An insulation system according to claim 1, including an inner capillary-active layer within the capillary-active slot between the surface of the pipe or the container and the surrounding heat insulating layer, which capillary-active layer at least partly fills out the slot.

5. An insulation system according to claim 1, including a capillary sucking material disposed in the capillary-active opening or openings in the insulating layer.

6. An insulation system according to claim 1, wherein the heat insulating layer consists of an insulating material which is diffusion-proof per se.

7. An insulation system according to claim 6, wherein a cavity between the outer side of the insulating layer and the surrounding membrane is at least partly filled out by a capillary sucking material.

8. A method of providing an insulation system on a pipe or a container having a surface temperature which for shorter or longer periods is lower than the dew point temperature of ambient air, wherein a heat insulating layer is provided around the pipe or the container so as to form an inner capillary-active slot between a surface of the pipe or the container and the heat insulating layer, that one or more capillary-active openings are provided in the heat insulating layer, which openings connect an inner side of the insulating layer with an outer side thereof, so that condensed water can be transported by capillary action from the surface of the pipe or the container to the outer side of the insulating layer, from wherein can evaporate, said heat insulating layer having a diffusion proof outer side and being surrounded by a water-repellant membrane, comprising the step of positioning a water-repellant membrane around the insulating layer so as to form a cavity between the outer side of the insulating layer and the membrane.

9. A method according to claim 8, characterized wherein said membrane is made of a water-proof and diffusion-open material.

10. A method according to claim 9, wherein said membrane is in the form of a plastic or metal sheath.

11. A method according to claim 8, comprising the step of disposing a capillary sucking material within the inner capillary-active slot, which material at least partly fills out the slot.

12. A method according to claim 8, comprising the step of disposing a capillary sucking material within the capillary-active opening or openings in the insulating layer.

* * * * *